United States Patent
Yoshikawa

(10) Patent No.: US 7,372,380 B2
(45) Date of Patent: May 13, 2008

(54) DATA TRANSMITTING/RECEIVING DEVICE

(75) Inventor: Takefumi Yoshikawa, Osaka (JP)

(73) Assignee: Matsushita Elecetric Industrial Co., Ltd., Osaka (JP)

( * ) Notice: Subject to any disclaimer, the term of this patent is extended or adjusted under 35 U.S.C. 154(b) by 824 days.

(21) Appl. No.: 10/781,788

(22) Filed: Feb. 20, 2004

(65) Prior Publication Data

US 2004/0179638 A1    Sep. 16, 2004

(30) Foreign Application Priority Data

Mar. 11, 2003  (JP) .............................. 2003-064376

(51) Int. Cl.
*H03M 9/00* (2006.01)
(52) U.S. Cl. ...................... 341/100; 341/101
(58) Field of Classification Search ................ 341/100, 341/101
See application file for complete search history.

(56) References Cited

U.S. PATENT DOCUMENTS

| | | | | |
|---|---|---|---|---|
| 4,710,922 A | * | 12/1987 | Scott | 370/535 |
| 5,587,709 A | * | 12/1996 | Jeong | 341/100 |
| 5,982,309 A | * | 11/1999 | Xi et al. | 341/101 |
| 6,107,946 A | * | 8/2000 | Jeong | 341/101 |
| 6,150,965 A | * | 11/2000 | Carr et al. | 341/101 |
| 6,219,357 B1 | * | 4/2001 | Ishikawa | 370/535 |
| 6,370,162 B1 | * | 4/2002 | Takahashi et al. | 370/517 |
| 6,476,738 B1 | * | 11/2002 | Mitsutani | 341/100 |
| 6,684,275 B1 | * | 1/2004 | Goldstein | 710/71 |
| 7,095,778 B2 | * | 8/2006 | Okubo et al. | 375/130 |
| 7,107,479 B2 | * | 9/2006 | Gredone et al. | 713/600 |
| 7,259,702 B2 | * | 8/2007 | Rai et al. | 341/100 |
| 2002/0006167 A1 | * | 1/2002 | McFarland | 375/260 |
| 2003/0031133 A1 | | 2/2003 | Momtaz | |

FOREIGN PATENT DOCUMENTS

| | | |
|---|---|---|
| JP | 08-062298 | 3/1996 |
| JP | 11-88312 | 3/1999 |
| JP | 2000-67577 A | 3/2000 |
| JP | 2002-057727 | 2/2002 |
| JP | 2002-300143 | 10/2002 |

OTHER PUBLICATIONS

Japanese Office Action, with English Translation, issued in Japanese Patent Application No. 2003-064376, dated on Feb. 5, 2008.

* cited by examiner

*Primary Examiner*—Linh Nguyen
(74) *Attorney, Agent, or Firm*—McDermott Will & Emery LLP

(57) ABSTRACT

The first data transmitting/receiving device according to the present invention includes: a serial-parallel conversion circuit for converting received first serial data to first parallel data; a data selection circuit for selecting any one of the first parallel data and externally-supplied second parallel data and outputting the selected data; and a parallel-serial conversion circuit for converting the first or second parallel data output from the data selection circuit to second serial data which is to be transmitted.

14 Claims, 9 Drawing Sheets

DATA TRANSMITTING/RECEIVING DEVICE

BACKGROUND OF THE INVENTION

1. Field of the Invention

The present invention relates to a data transmitting/receiving device for transmitting and receiving data and specifically to a data transmitting/receiving device including conversion between serial data and parallel data.

2. Description of the Prior Art

Conventionally, a data transmitting/receiving device for transmitting and receiving data has been implemented in the form of a LSI device and widely utilized. Especially, a data transmitting/receiving device for transmitting and receiving serial data includes a parallel-serial conversion circuit and a serial-parallel conversion circuit because data input from/output to an internally- or externally-provided data processing section is in the form of parallel data.

FIG. 8 shows a circuit structure of a conventional data transmitting/receiving device. As shown in FIG. 8, the conventional data transmitting/receiving device 100 includes a transmission serial port 101 and reception serial port 102 for transferring a differential signal, a driver 103 for outputting transmission data TD, which is serial data, in the form of differential signal (TD+, TD−) to the transmission serial port 101, a receiver 104 for outputting differential signal (RD+, RD−) receiving at the reception serial port 102 as reception data RD which is serial data, a parallel-serial conversion circuit (P/S circuit) 105 for converting parallel data of 10-bit width to serial data, and a serial-parallel conversion circuit (S/P circuit) 106 for converting serial data to parallel data of 10-bit width. The data transmitting/receiving device 100 further includes a phase locked loop (PLL) 107 as a circuit for supplying an operation clock to the parallel-serial conversion circuit 105, and a clock recovery unit (CRU) 108 as a circuit for supplying an operation clock to the serial-parallel conversion circuit 106.

The parallel-serial conversion circuit 105 converts input data DIN [0:9], which has been supplied from an external circuit (not shown) that performs data processing, to transmission data TD of 1-bit width using internal clock CLK output from the PLL 107 as the operation clock. The transmission data TD is output to the driver 103. The PLL 107 multiplies the frequency of externally-supplied reference clock RefCLK by 10 and outputs a resultant clock as internal clock CLK.

The serial-parallel conversion circuit 106 converts reception data RD, which has been received from the reception serial port 102 through a receiver 104, to output data DOUT [0:9] of 10-bit width using recovery clock RCLK as the operation clock, and the resultant data is output to an external circuit.

In the process where reception data RD is latched and converted to parallel data in the serial-parallel conversion circuit 106, reception data RD is latched at a timing delayed by a ½ cycle from a rising edge of reception data RD, whereby bit errors are reduced and data is surely extracted.

To this end, the CRU 108 adjusts the frequency and phase of internal clock CLK to output recovery clock RCLK whose frequency is equal to that of reception data RD and whose phase is delayed by a ½ cycle with respect to that of reception data RD.

As a reliability evaluation method for the conventional data transmitting/receiving device 100, an evaluation method called a loop back test is employed wherein the transmission serial port 101 and the reception serial port 102 are connected to determined whether or not input data DIN [0:9] and output data DOUT [0:9] are identical. The loop back test is effective in checking abnormal operation of the driver 103, the receiver 104, the parallel-serial conversion circuit 105, and the serial-parallel conversion circuit 106.

In addition to the loop back test, it is preferable to measure the jitter followability (jitter tolerance) of the data transmitting/receiving device in order to evaluate whether or not the CRU 108 outputs recovery clock RCLK while following the jitter of reception data RD even if a jitter is added to reception data RD.

FIG. 9 shows a jitter tolerance measurement system for the conventional data transmitting/receiving device 100. As shown in FIG. 9, a data generator 111 generates data for test (test data) which has a 1-bit width and inputs the generated test data to the reception serial port 102 of the data transmitting/receiving device 100. Then, output data DOUT [0:9] output from the data transmitting/receiving device 100 is input to a data analyzer 112. Herein, the operation clock of the data generator 111 is modulated using a clock modulator 113 to add a predetermined jitter to the test data. Since the data analyzer 112 processes parallel data of 10-bit width, the operation clock used for the data generator 111 is divided by a frequency divider 114 into a ¹⁄₁₀ clock which is then supplied as the operation clock of the data analyzer 112.

However, in a jitter tolerance measurement system for the conventional data transmitting/receiving device, the data analyzer 112 obtains the operation clock through an internal PLL. Thus, even if the clock modulated by the clock modulator 113 is input to the data analyzer 112 through the frequency divider 114, modulation of the clock is filtered by a PLL provided inside the data analyzer 112. As a result, the frequency of the modulated output data DOUT output from the data transmitting/receiving device 100 is not identical to that of the operation clock of the data analyzer 112. Therefore, even when data received by the data transmitting/receiving device 100 while following the jitter of reception data RD is output with no error, it is misrecognized that a bit error has occurred. Thus, the jitter tolerance is not correctly measured.

One of the possible countermeasures against such a problem is a method wherein data in the form of serial data is supplied to the data analyzer 112 so that the jitter tolerance is measured without using the frequency divider 114 while the PLL provided inside the data analyzer is inactive.

However, in the conventional data transmitting/receiving device, if it is attempted to directly provide the serial data output from the CRU 108 to the data analyzer 112, the bit rate of received data RD is not followed because the output buffer of the data transmitting/receiving device 100 is designed so as to comply with the bit rate of output data DOUT.

As described above, in the conventional data transmitting/receiving device, parallel data is analyzed in the measurement of the jitter tolerance, and therefore, it is difficult to appropriately measure the jitter tolerance of the data transmitting/receiving device.

SUMMARY OF THE INVENTION

The present invention solves the above-described conventional problems and realizes appropriate measurement of the jitter tolerance of a data transmitting/receiving device.

For the purpose of achieving the above objective, the present invention has a structure wherein data received at a reception serial port can be transmitted from a transmission serial port such that the jitter tolerance can be measured using serial data.

Specifically, the first data transmitting/receiving device of the present invention comprises: a serial-parallel conversion circuit for converting received first serial data to first parallel data; a data selection circuit for selecting any one of the first parallel data and externally-supplied second parallel data and outputting the selected data; and a parallel-serial conversion circuit for converting the first or second parallel data output from the data selection circuit to second serial data which is to be transmitted.

The first data transmitting/receiving device of the present invention includes a data selection circuit for selecting first or second parallel data and inputting it to a parallel-serial conversion circuit. In the measurement of the jitter tolerance, the data selection circuit is allowed to select parallel data output from a serial-parallel conversion circuit. Test data to which a jitter is added is input as the first serial data to a reception port of the first data transmitting/receiving device, and the second serial data output to a transmission port through the serial-parallel conversion circuit and the parallel-serial conversion circuit is analyzed, whereby the jitter tolerance is measured.

In the first data transmitting/receiving device of the present invention, it is preferable that the parallel-serial conversion circuit operates in synchronization with the serial-parallel circuit when the data selection circuit selects the first parallel data.

With such a structure wherein the parallel-serial conversion circuit operates in synchronization with the serial-parallel circuit, serial data which is in synchronization with test data is output from a transmission port when the jitter tolerance is measured as described above. Therefore, the jitter tolerance is readily and surely measured by analyzing the data using the operation clock of a component which outputs the test data.

Preferably, the first data transmitting/receiving device of the present invention further comprises a clock adjustment circuit for receiving a first clock signal and the first serial data and adjusting the first clock signal to output a second clock signal which is in synchronization with the first serial data, wherein the serial-parallel conversion circuit operates in synchronization with the second clock signal.

With such a structure, the serial-parallel conversion circuit is in synchronization with received serial data. Therefore, the bit error in the serial-parallel conversion circuit is reduced.

Preferably, the first data transmitting/receiving device of the present invention further comprises a clock selection circuit for selecting any one of the first clock signal and the second clock signal and inputting the selected clock signal to the parallel-serial conversion circuit, wherein: when the data selection circuit selects the first parallel data, the clock selection circuit selects the second clock signal; and when the data selection circuit selects the second parallel data, the clock selection circuit selects the first clock signal.

With such a structure, when the data selection circuit selects the first parallel data, the second clock signal is input to the parallel-serial conversion circuit. Therefore, synchronization between the parallel-serial conversion circuit and the serial-parallel conversion circuit is surely established.

The second data transmitting/receiving device of the present invention comprises: a serial-parallel conversion circuit for converting received first serial data to first parallel data; a data processing circuit for outputting second parallel data; a control circuit for stopping the operation of the data processing circuit; a data selection circuit for selecting any one of the first parallel data and the second parallel data and outputting the selected data; and a parallel-serial conversion circuit for converting the first or second parallel data output from the data selection circuit to serial data which is to be transmitted.

The second data transmitting/receiving device of the present invention includes a data selection circuit. Test data to which a jitter is added is input as the first serial data to a reception port of the first data transmitting/receiving device, and the second serial data output at a transmission port is analyzed, whereby the jitter tolerance is measured. The second data transmitting/receiving device further includes a control circuit for stopping the operation of the data transmitting/receiving device. Thus, the jitter tolerance is measured while evaluating whether or not an effect of noise caused by the operation of the data processing circuit exists.

In the second data transmitting/receiving device of the present invention, it is preferable that the parallel-serial conversion circuit operates in synchronization with the serial-parallel circuit when the data selection circuit selects the first parallel data.

Preferably, the second data transmitting/receiving device of the present invention further comprises a clock adjustment circuit for receiving a first clock signal and the first serial data and adjusting the first clock signal to output a second clock signal which is in synchronization with the first serial data, wherein the serial-parallel conversion circuit operates in synchronization with the second clock signal.

Preferably, the second data transmitting/receiving device of the present invention further comprises a clock selection circuit for selecting any one of the first clock signal and the second clock signal and inputting the selected clock signal to the parallel-serial conversion circuit, wherein: when the data selection circuit selects the first parallel data, the clock selection circuit selects the second clock signal; and when the data selection circuit selects the second parallel data, the clock selection circuit selects the first clock signal.

In the second data transmitting/receiving device of the present invention, it is preferable that: the data processing circuit is divided into a plurality of units, the distances of the plurality of units from the clock adjustment circuit being different from each other; and the control circuit stops the operation of the data processing circuit independently for each of the units.

With such a structure, the jitter tolerance is measured while evaluating the size of the data processing circuit and the distance between the data processing circuit and the clock adjustment circuit.

The third data transmitting/receiving device of the present invention comprises: a latch circuit for storing received first serial data; a serial-parallel conversion circuit for converting the first serial data to first parallel data; a parallel-serial conversion circuit for converting externally-supplied second parallel data to second serial data; and a data selection circuit for selecting any one of the first serial data and the second serial data and outputting the selected data as transmission data.

The third data transmitting/receiving device of the present invention includes a data selection circuit for selecting any one of the first serial data and the second serial data and outputting the selected data as transmission data. In the measurement of the jitter tolerance, the data selection circuit is allowed to select the first serial data stored in a latch circuit. Therefore, test data to which a jitter is added is input as the first serial data, and the data output to a transmission port through the latch circuit is analyzed, whereby the jitter tolerance is measured. Furthermore, since the serial data is transmitted without being passed through the parallel-serial conversion circuit or the serial-parallel conversion circuit, the jitter tolerance of the data transmitting/receiving device can be measured even when a malfunction occurs in the parallel-serial conversion circuit or the serial-parallel conversion circuit.

Preferably, the third data transmitting/receiving device of the present invention further comprises a clock adjustment circuit for receiving a first clock signal and the first serial data and adjusting the first clock signal to output a second clock signal which is in synchronization with the first serial data, wherein the latch circuit and the serial-parallel conversion circuit operate in synchronization with the second clock signal.

The fourth data transmitting/receiving device of the present invention comprises: a latch circuit for storing received first serial data; a serial-parallel conversion circuit for converting the first serial data to first parallel data; a data processing circuit for outputting second parallel data; a control circuit for stopping the operation of the data processing circuit; a parallel-serial conversion circuit for converting the second parallel data to second serial data; and a data selection circuit for selecting any one of the first serial data and the second serial data and outputting the selected data as transmission data.

The fourth data transmitting/receiving device of the present invention includes a data selection circuit. Test data to which a jitter is added is input as the first serial data, and the data output at a transmission port through a latch circuit is analyzed, whereby the jitter tolerance is measured. Furthermore, since the fourth data transmitting/receiving device includes a control circuit for stopping the operation of the data processing circuit, the jitter tolerance is measured while evaluating whether or not an effect of noise caused by the operation of the data processing circuit exists.

Preferably, the fourth data transmitting/receiving device of the present invention further comprises a clock adjustment circuit for receiving a first clock signal and the first serial data and adjusting the first clock signal to output a second clock signal which is in synchronization with the first serial data, wherein the latch circuit and the serial-parallel conversion circuit operate in synchronization with the second clock signal.

In the fourth data transmitting/receiving device of the present invention, it is preferable that when the control circuit stops the data processing circuit, the parallel-serial conversion circuit and the serial-parallel conversion circuit stop their operation.

With such a structure, the jitter tolerance is measured while evaluating whether or not an effect of noise caused by the operation of the data processing circuit, the parallel-serial conversion circuit and the serial-parallel conversion circuit exists.

In the fourth data transmitting/receiving device of the present invention, it is preferable that the data processing circuit is divided into a plurality of units, the distances of the plurality of units from the clock adjustment circuit being different from each other; and the control circuit stops the operation of the data processing circuit independently for each of the units.

With such a structure, the jitter tolerance is measured while evaluating the size of the data processing circuit and the distance between the data processing circuit and the clock adjustment circuit.

In the fourth data transmitting/receiving device of the present invention, it is preferable that when the control circuit stops at least one of the plurality of units, the parallel-serial conversion circuit and the serial-parallel conversion circuit stop their operation.

With such a structure, the effects of the size of the data processing circuit and the distance between the data processing circuit and the clock adjustment circuit on the jitter tolerance are evaluated more accurately in a state where the effects of noise caused by the operation of the parallel-serial conversion circuit and the serial-parallel conversion circuit are absent.

According to the first or second data transmitting/receiving device, parallel data output from a serial-parallel conversion circuit can be input to a parallel-serial conversion circuit. Thus, in the measurement of the jitter tolerance, if test data is transmitted from an external device to the data transmitting/receiving device, the test data is output from a transmission port of the data transmitting/receiving device. Therefore, the measurement test of the jitter tolerance is surely achieved by analyzing the data output from the transmission port of the data transmitting/receiving device.

According to the third or fourth data transmitting/receiving device of the present invention, reception data can be latched, and the latched reception data can be output to a transmission port. Thus, in the measurement of the jitter tolerance, the jitter tolerance is tested without being affected by a malfunction of the parallel-serial conversion circuit or the serial-parallel conversion circuit.

DESCRIPTION OF THE PREFERRED EMBODIMENTS

Embodiment 1

A data transmitting/receiving device according to embodiment 1 of the present invention is described with reference to the drawings.

Figure 1:
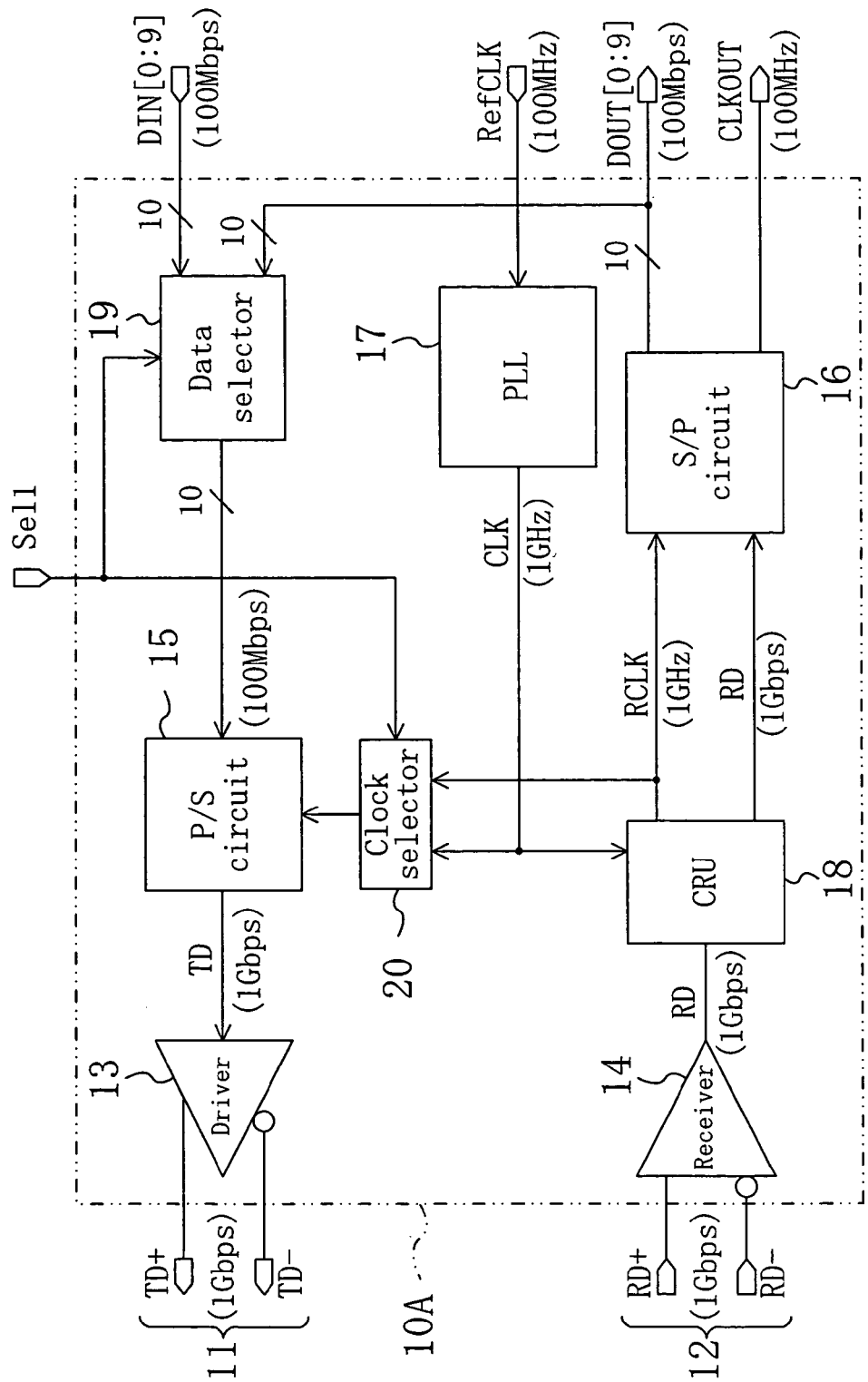
FIG. 1 is a block diagram showing the structure of a data transmitting/receiving device according to embodiment 1 of the present invention.

Referring to FIG. 1, the data transmitting/receiving device 10A according to embodiment 1 of the present invention includes a transmission serial port 11 and a reception serial port 12, each of which transfers a differential signal, a driver 13 for converting serial data to a differential signal, a receiver 14 for converting an input differential signal to serial data, a parallel-serial conversion circuit (P/S circuit) 15 for converting parallel data of 10-bit width to serial data, a serial-parallel conversion circuit (S/P circuit) 16 for converting serial data to parallel data of 10-bit width, a phase locked loop (PLL) circuit 17 for multiplying the frequency of an input clock signal by 10, a clock recovery unit (CRU) 18 for adjusting the phase and frequency of the clock signal according to the input serial data.

The data transmitting/receiving device 10A further includes a data selector 19 for selecting parallel data which is to be input to the parallel-serial conversion circuit 15 and a clock selector 20 for selecting a clock signal which is to be input to the parallel-serial conversion circuit 15.

The data transmitting/receiving device 10A is connected to an external circuit (not shown) which performs data processing, such as an LSI circuit, or the like. The data selector 19 selects any one of input data DIN [0:9] of 10-bit width, which has been input from the external circuit, and output data DOUT [0:9] of 10-bit width, which has been output from the serial-parallel conversion circuit 16. The selected data is input to the parallel-serial conversion circuit 15. It should be noted that "[0:9]" suffixed to input data DIN [0:9] and output data DOUT [0:9] denotes 10 signal lines [0] to [9]. The parallel-serial conversion circuit 15 converts the parallel data input from the data selector 19 to serial data. The serial data is output as transmission data TD to the driver 13. The driver 13 outputs transmission data TD to the transmission serial port 11 as a differential signal (TD+, TD−).

The clock selector 20 selects any one of internal clock output from the PLL 17 based on externally-supplied reference clock RefCLK and recovery clock RCLK output from the CRU 18 as the operation clock of the parallel-serial conversion circuit 15.

In the data transmitting/receiving device 10A, the differential signal (RD+, RD−) received by the reception serial port 12 is converted by the receiver 14 to serial data and output as reception data RD. Reception data RD output from the receiver 14 is input to the serial-parallel conversion circuit 16 through the CRU 18 and converted to output data DOUT [0:9] of 10-bit width. Data DOUT [0:9] of 10-bit width is output to the external circuit.

The CRU 18 receives internal clock CLK from the PLL 17 and adjusts internal clock CLK so as to have a frequency equal to that of reception data RD input from the receiver 14 and a phase shifted by a ½ cycle with respect to that of reception data RD. The adjusted clock is output as recovery clock RCLK. As a result, reception data RD is securely latched using recovery clock RCLK as the operation clock of the serial-parallel conversion circuit 16.

Now, consider a case where the frequency of reference clock RefCLK is 100 MHz, and the bit rate of input data DIN [0:9] is 100 Megabits per second (Mbps). In this case, the frequency of internal clock CLK output from the PLL 17 is 1 GHz. Therefore, the parallel-serial conversion circuit 15 outputs transmission data TD at the high speed of 1 Gbps using internal clock CLK of 1 GHz as the operation clock. The receiver 14 receives reception data RD of 1 Gbps. The frequency of recovery clock RCLK output from the CRU 18 is 1 GHz. The serial-parallel conversion circuit 16 outputs output data DOUT [0:9] having a bit rate of 100 Mbps and clock CLKOUT having a frequency of 100 MHz.

Hereinafter, the operation of the data transmitting/receiving device 10A of embodiment 1 is described for respective modes with reference to FIGS. 1 and 2.

In the data transmitting/receiving device 10A, the data selector 19 and the clock selector 20 are controlled by first selection signal Sel1 which selects the operation mode of the data transmitting/receiving device 10A. When first selection signal Sel1 is at "L" level, "normal operation mode" is selected wherein data of the external circuit is transmitted or transmission data TD is input to the external circuit. When first selection signal Sel1 is at "H" level, "test mode" is selected wherein the data transmitting/receiving device 10A is connected to a jitter tolerance measurement system for measuring the jitter tolerance.

In the case where first selection signal Sel1 is at "L" level so that the data transmitting/receiving device 10A is used in the normal operation mode, the data selector 19 selects input data DIN [0:9] and inputs it to the parallel-serial conversion circuit 15. Meanwhile, the clock selector 20 selects internal clock CLK and inputs it to the parallel-serial conversion circuit 15. Accordingly, the parallel-serial conversion circuit 15 converts externally-supplied input data DIN [0:9] to transmission data TD in synchronization with internal clock CLK and outputs transmission data TD to the driver 13. Thus, the data input from an external circuit is output from the transmission serial port 11.

In the case where first selection signal Sel1 is at "H" level so that the data transmitting/receiving device 10A is used in the test mode, the data selector 19 selects output data DOUT [0:9] and inputs it to the parallel-serial conversion circuit 15. Meanwhile, the clock selector 20 selects recovery clock RCLK and inputs it to the parallel-serial conversion circuit 15. Accordingly, the parallel-serial conversion circuit 15 converts output data DOUT [0:9] to transmission data TD in synchronization with the serial-parallel conversion circuit 16 and outputs transmission data TD to the driver 13. Thus, the data input from the reception serial port 12 is output from the transmission serial port 11.

Figure 2:
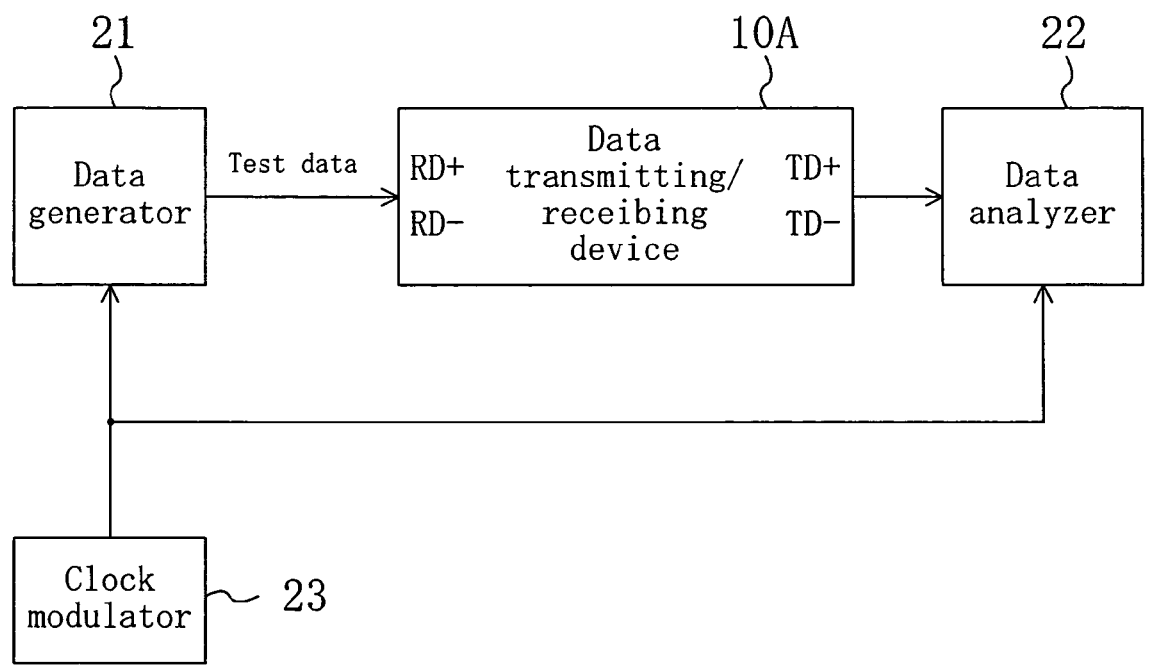
FIG. 2 is a block diagram showing a measurement system for measuring the jitter tolerance of the data transmitting/receiving device according to embodiment 1 of the present invention.

FIG. 2 shows a block structure of a jitter tolerance measurement system used in the test mode. When the data transmitting/receiving device 10A is used in the test mode, a data generator 21 which outputs data for the test (test data) is connected to the reception serial port 12 of the data transmitting/receiving device 10A, and a data analyzer 22 is connected to the transmission serial port 11 of the data transmitting/receiving device 10A as shown in FIG. 2.

The data generator 21 generates data in synchronization with a 1 GHz modulated clock output from a clock modulator 23, thereby transmitting to the reception serial port 12 test data to which a jitter of a predetermined variation is added. Meanwhile, data received by the reception serial port 12 is output from the transmission serial port 11 of the data transmitting/receiving device 10A. Thus, the jitter tolerance of the data transmitting/receiving device 10A can be evaluated by analyzing data transmitted from the transmission serial port 11 with the data analyzer 22 to check whether or not a bit error exists.

As described above, since the data transmitting/receiving device 10A of embodiment 1 includes the data selector 19 which inputs output data DOUT to the parallel-serial conversion circuit, reception data RD can be transmitted as transmission data TD to the data analyzer. Thus, it is possible to readily and surely perform the jitter tolerance measurement test.

First Variation of Embodiment 1

Hereinafter, a data transmitting/receiving device according to the first variation of embodiment 1 of the present invention is described with reference to the drawings.

Figure 3:
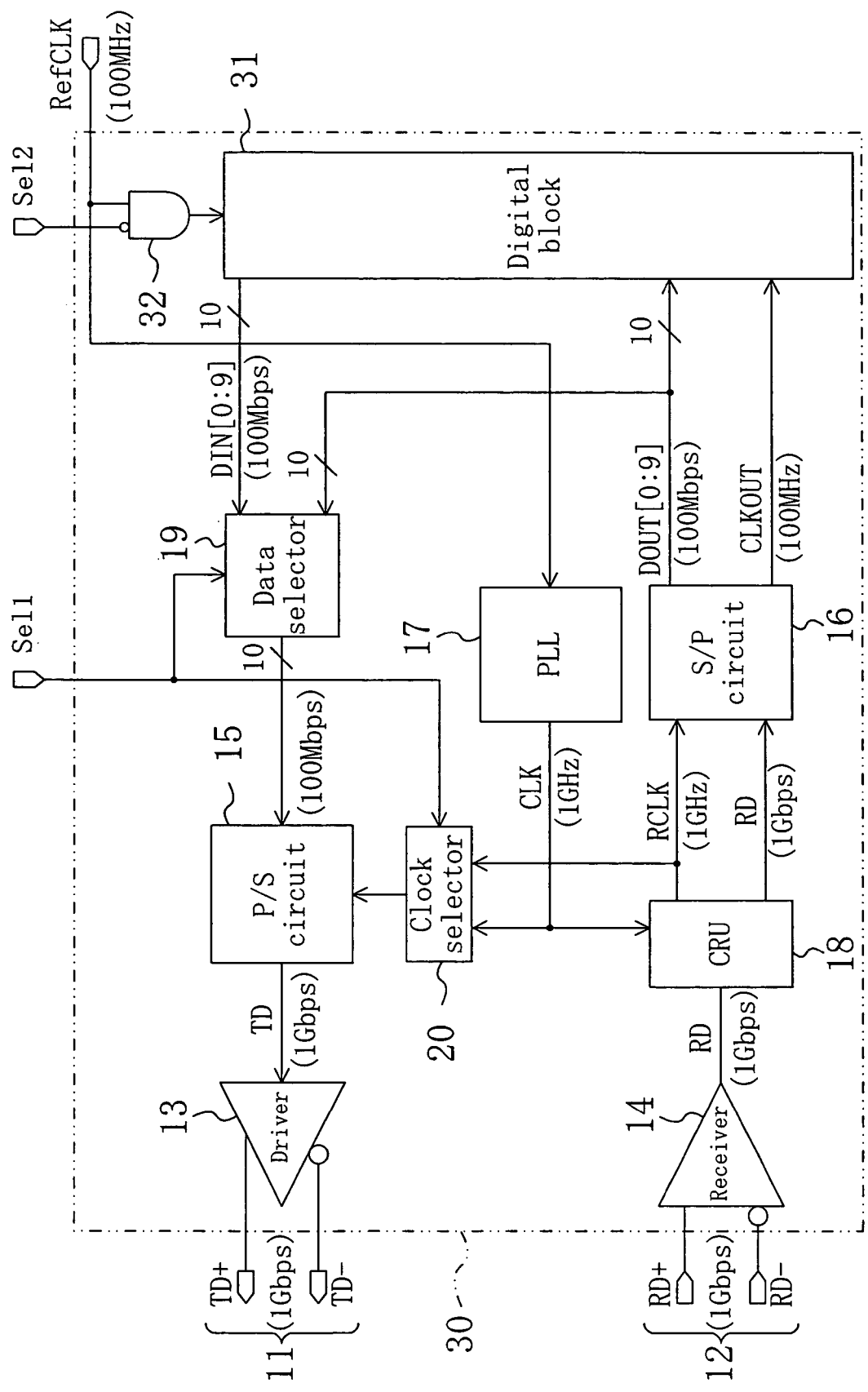
FIG. 3 is a block diagram showing the structure of a data transmitting/receiving device according to the first variation of embodiment 1 of the present invention.

FIG. 3 shows a block structure of the data transmitting/receiving device according to the first variation of embodiment 1 of the present invention. In FIG. 3, like elements are denoted by like reference numerals used in FIG. 1, and descriptions thereof are herein omitted.

As shown in FIG. 3, the data transmitting/receiving device 30 according to the first variation of embodiment 1 is different from the data transmitting/receiving device 10A in that a digital block 31 for inputting/outputting parallel data is provided inside the data transmitting/receiving device 30, and the data transmitting/receiving device 30 has a logic cell 32 as means for stopping the operation of the digital block 31.

The digital block 31 operates using externally-supplied reference clock RefCLK as an operation clock. The digital block 31 inputs input data DIN [0:9] to the parallel-serial conversion circuit 15 through the data selector 19 and, on the other hand, receives output data DOUT [0:9] and output clock CLKOUT which are output from the serial-parallel conversion circuit 16.

The logic cell 32 receives second selection signal Sel2 and controls whether or not reference clock RefCLK is supplied to the digital block 31. In the example described herein, when second selection signal Sel2 is at "L" level, the logic cell 32 supplies reference clock RefCLK to the digital block 31. When second selection signal Sel2 is at "H" level, the logic cell 32 stops the supply of reference clock RefCLK, thereby stopping the operation of the digital block 31.

Hereinafter, the data transmitting/receiving device 30 according to the first variation of embodiment 1 is described for respective modes with reference to FIGS. 2 and 3.

In the case where first selection signal Sel1 is at "L" level so that the data transmitting/receiving device 30 is used in the normal operation mode, second selection signal Sel2 is set to "L" level such that the operation clock is supplied to the digital block 31. The data selector 19 selects input data DIN [0:9] output from the digital block 31 and inputs it to the parallel-serial conversion circuit 15. Meanwhile, the clock selector 20 selects internal clock CLK and inputs it to the parallel-serial conversion circuit 15. Accordingly, the parallel-serial conversion circuit 15 converts input data DIN [0:9] input from the digital block 31 to transmission data TD in synchronization with internal clock CLK and outputs transmission data TD to the driver 13. Thus, the data of the digital block 31 is output from the transmission serial port 11.

In the case where first selection signal Sel1 is at "H" level so that the data transmitting/receiving device 30 is used in the test mode, the data selector 19 selects output data DOUT [0:9] and inputs it to the parallel-serial conversion circuit 15. Meanwhile, the clock selector 20 selects recovery clock RCLK and inputs it to the parallel-serial conversion circuit 15. Accordingly, the parallel-serial conversion circuit 15 converts output data DOUT [0:9] to transmission data TD in synchronization with the serial-parallel conversion circuit 16 and outputs transmission data TD to the driver 13. Thus, the data input from the reception serial port 12 is output from the transmission serial port 11.

In the case where the data transmitting/receiving device 30 according to the first variation of embodiment 1 is used in the test mode, the data generator 21 is connected to the reception serial port 12 of the data transmitting/receiving device 30, and the data analyzer 22 is connected to the transmission serial port 11 of the data transmitting/receiving device 30 as in the jitter tolerance measurement system shown in FIG. 2. Then, test data is transmitted from the data generator 21 and analyzed by the data analyzer 22 as to whether or not a bit error exists, whereby the jitter tolerance of the data transmitting/receiving device 30 is evaluated.

When second selection signal Sel2 is at "H" level, the logic cell 32 stops the supply of reference clock RefCLK to the digital block 31, and therefore, the digital block 31 does not operate. Thus, in this case, the jitter tolerance is evaluated in a state where the effects of the digital block 31 on the CRU 18 are absent.

When second selection signal Sel2 is at "L" level, the logic cell 32 supplies reference clock RefCLK to the digital block 31, so that the digital block 31 operates to affect the operation of the CRU 18. Thus, in this case, the jitter tolerance is evaluated in a state where the digital block 31 is affected by the CRU 18.

According to the data transmitting/receiving device 30 according to the first variation of embodiment 1, the operation of the digital block 31 can be stopped by the second selection signal Sel2, and therefore, whether or not an effect of noise caused by the operation of the digital block 31 exists can be evaluated in the measurement of the jitter tolerance. Thus, it is possible to quantitatively evaluate the jitter tolerance.

Second Variation of Embodiment 1

Hereinafter, a data transmitting/receiving device according to the second variation of embodiment 1 of the present invention is described with reference to the drawings.

Figure 4:
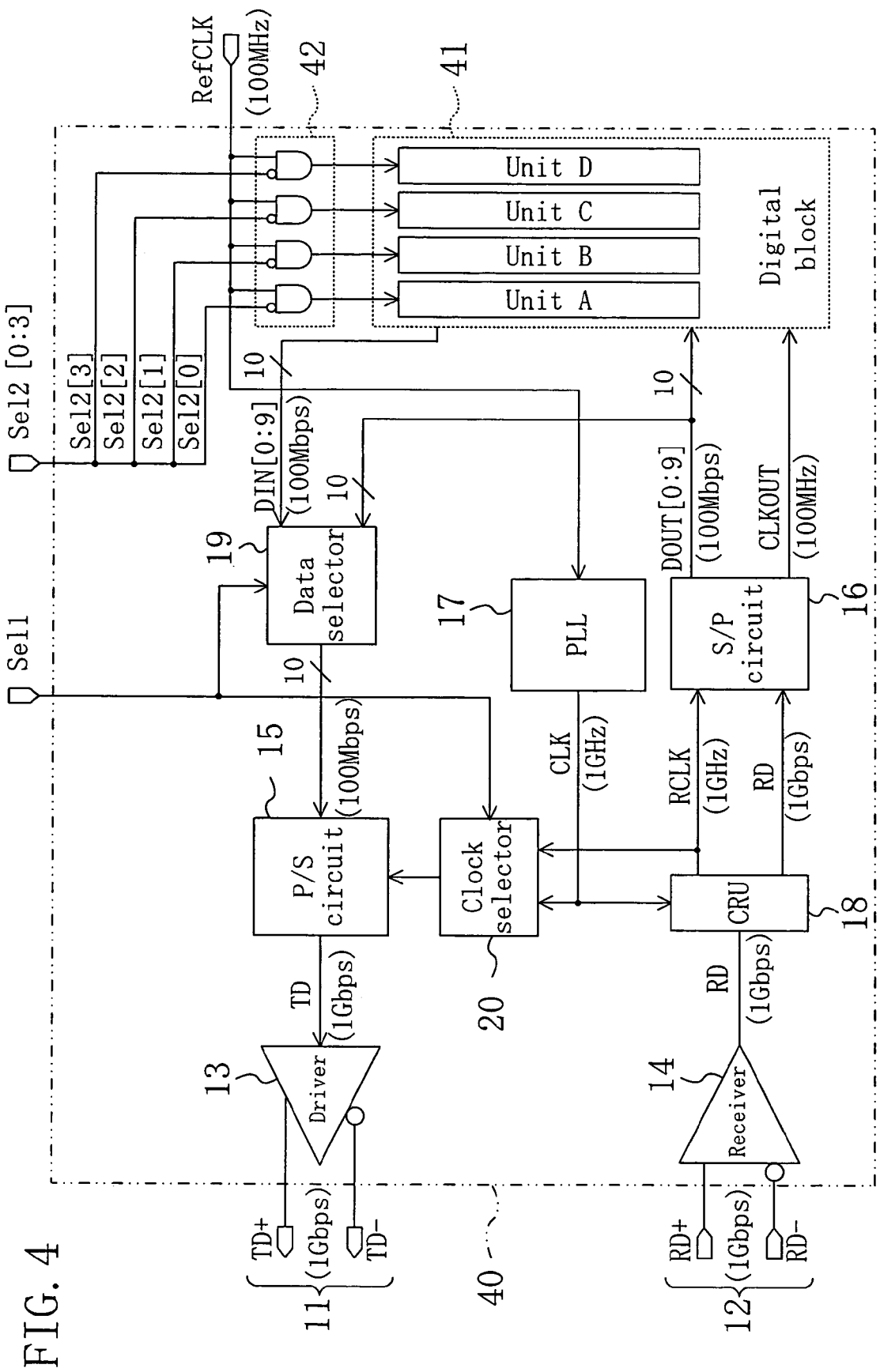
FIG. 4 is a block diagram showing the structure of a data transmitting/receiving device according to the second variation of embodiment 1 of the present invention.

FIG. 4 shows a block structure of the data transmitting/receiving device according to the second variation of embodiment 1 of the present invention. In FIG. 4, like elements are denoted by like reference numerals used in FIGS. 1 and 3, and descriptions thereof are herein omitted.

As shown in FIG. 4, the data transmitting/receiving device 40 according to the second variation of embodiment 1 includes a digital block 41 in place of the digital block 31 of the first variation. The digital block 41 includes separate units A to D, the distances of which from the CRU 18 are different from each other. The data transmitting/receiving device 40 further includes a logic block 42. The logic block 42 includes four logic cells which are respectively connected to the four units A to D. The input of reference clock RefCLK is controlled by second selection signal Sel2 [0:3] of 4-bit width which corresponds to the units A to D.

The logic block 42 controls independently an operation clock which is to be supplied to each unit of the digital block 41 according to second selection signal Sel2 [0:3]. Specifically, signals Sel2[0] to Sel2[3] of second selection signal Sel2 [0:3] correspond to units A to D of the logic block 42, respectively. When each of signals Sel2[0] to Sel2[3] is at "L" level, a corresponding unit is supplied with reference clock RefCLK. When each of signals Sel2[0] to Sel2[3] is at "H" level, the supply of reference clock RefCLK to a corresponding unit is stopped.

Hereinafter, the operation of the data transmitting/receiving device 40 according to the second variation of embodiment 1 is described for respective modes with reference to FIGS. 2 and 4.

In the case where first selection signal Sel1 is at "L" level so that the data transmitting/receiving device 40 is used in the normal operation mode, all of signals Sel2[0] to Sel2[3] of second selection signal Sel2 [0:3] are set to "L" level such that the operation clock is supplied to the respective units of the digital block 41. The data selector 19 selects input data DIN [0:9] output from the digital block 41 and inputs the selected data to the parallel-serial conversion circuit 15. Meanwhile, the clock selector 20 selects internal clock CLK and inputs it to the parallel-serial conversion circuit 15. Accordingly, the parallel-serial conversion circuit 15 converts input data DIN [0:9] input from the digital block 41 to transmission data TD in synchronization with internal clock CLK and outputs transmission data TD to the driver 13. Thus, the data of the digital block 41 is output from the transmission serial port 11.

In the case where first selection signal Sel1 is at "H" level so that the data transmitting/receiving device 40 is used in the test mode, the data selector 19 selects output data DOUT [0:9] and inputs it to the parallel-serial conversion circuit 15. Meanwhile, the clock selector 20 selects recovery clock RCLK and inputs it to the parallel-serial conversion circuit 15. Accordingly, the parallel-serial conversion circuit 15 converts output data DOUT [0:9] to transmission data TD in synchronization with the serial-parallel conversion circuit 16 and outputs transmission data TD to the driver 13. Thus, the data input from the reception serial port 12 is output from the transmission serial port 11.

In the case where the data transmitting/receiving device 40 according to the second variation of embodiment 1 is used in the test mode, the data generator 21 is connected to the reception serial port 12 of the data transmitting/receiving device 40, and the data analyzer 22 is connected to the transmission serial port 11 of the data transmitting/receiving device 40 as in the jitter tolerance measurement system shown in FIG. 2. Then, test data is transmitted from the data generator 21 and analyzed by the data analyzer 22 as to whether or not a bit error exists, whereby the jitter tolerance of the data transmitting/receiving device 40 is evaluated.

Each of units A to D of the digital block 41 does not operate when a corresponding signal of second selection signal Sel2 [0:3] is at "H" level but operates when the corresponding signal is at "L" level. Thus, for example, a case where only unit A is driven and a case where only unit D is driven are compared, whereby the effects of noise which vary according to the distance between the CRU 18 and the digital block is evaluated. Furthermore, a case where only unit A is driven and a case where three units A to C are driven are compared, whereby the effects of noise which vary according to the size of the digital block is evaluated.

As described above, according to the data transmitting/receiving device 40 according to the second variation of embodiment 1, the effects of noise which vary according to the size of the digital block and the distance from the CRU 18 can be evaluated in the measurement of the jitter tolerance.

In the second variation of embodiment 1, the number of units which constitute the digital block 41 is not limited to four. The digital block 41 is only required to be divided into a plurality of units. When the number of units which constitute the digital block 41 is changed, the bit width of second selection signal Sel2 is changed such that the number of bits is equal to the number of units, whereby each unit of the digital block 41 can be independently controlled.

Embodiment 2

Hereinafter, a data transmitting/receiving device according to embodiment 2 of the present invention is described with reference to the drawings.

Figure 5:
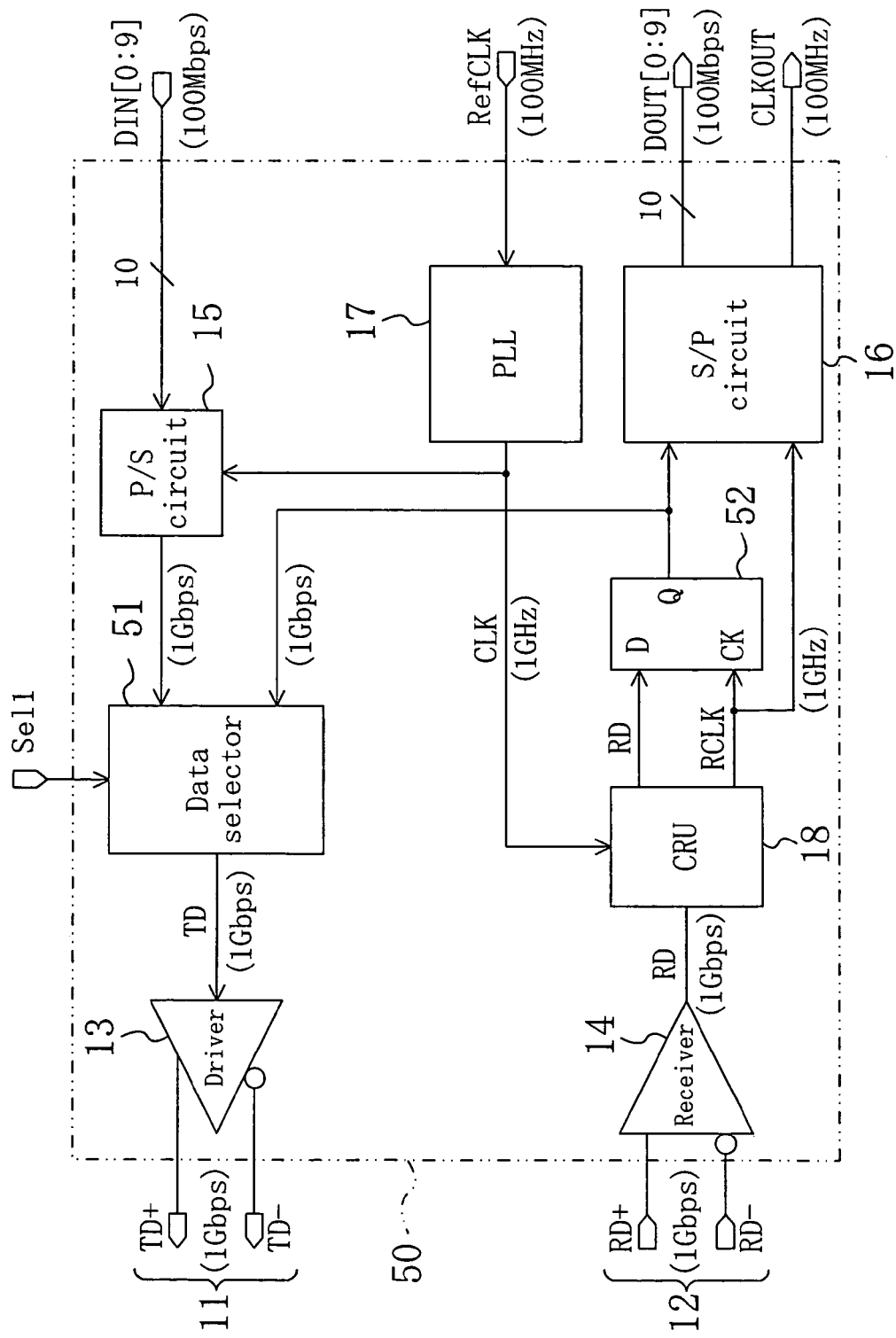
FIG. 5 is a block diagram showing the structure of a data transmitting/receiving device according to embodiment 2 of the present invention.

FIG. 5 shows a block structure of the data transmitting/receiving device according to embodiment 2 of the present invention. In FIG. 5, like elements are denoted by like reference numerals used in FIG. 1, and descriptions thereof are herein omitted.

Referring to FIG. 5, the data transmitting/receiving device 50 according to embodiment 2 includes the transmission serial port 11 and the reception serial port 12, the driver 13, the receiver 14, the parallel-serial conversion circuit 15, the serial-parallel conversion circuit 16, the PLL 17, and the CRU 18.

The data transmitting/receiving device 50 further includes a data selector 51 for selecting transmission data TD which is to be input to the driver 13 and a latch circuit 52 for latching reception data RD output from the CRU 18.

The latch circuit 52 operates in synchronization with recovery clock RCLK output from the CRU 18 to output reception data RD to the data selector 51 and the serial-parallel conversion circuit 16. The data selector 51 selects any one of serial data output from the latch circuit 52 and serial data output from the parallel-serial conversion circuit 15 and inputs the selected data to the driver 13.

The data transmitting/receiving device 50 is connected to an external circuit (not shown) which performs data processing, such as an LSI device, or the like. The parallel-serial conversion circuit 15 converts input data DIN [0:9] of 10-bit width, which is input from the external circuit, to serial data and inputs the serial data to the data selector 51. The serial-parallel conversion circuit 16 converts reception data RD, which is input through the CRU 18 and the latch circuit 52, to output data DOUT [0:9] of 10-bit width and outputs output data DOUT [0:9] to the external circuit.

Hereinafter, the operation of the data transmitting/receiving device 50 of embodiment 2 is described for respective modes with reference to FIGS. 2 and 5.

In the case where first selection signal Sel1 is at "L" level so that the data transmitting/receiving device 50 is used in the normal operation mode, the data selector 51 selects serial data output from the parallel-serial conversion circuit 15 and inputs the selected serial data to the driver 13. Thus, the data input from the external circuit is output from the transmission serial port 11.

In the case where first selection signal Sel1 is at "H" level so that the data transmitting/receiving device 50 is used in the test mode, the data selector 51 selects serial data output from the latch circuit 52 and inputs the selected serial data to the driver 13. Thus, the data input from the reception serial port 12 is output from the transmission serial port 11.

In the case where the data transmitting/receiving device 50 of embodiment 2 is used in the test mode, the data generator 21 is connected to the reception serial port 12 of the data transmitting/receiving device 50, and the data analyzer 22 is connected to the transmission serial port 11 of the data transmitting/receiving device 50 as in the jitter tolerance measurement system shown in FIG. 2. Test data is transmitted from the data generator 21 and analyzed by the data analyzer 22 as to whether or not a bit error exists, whereby the jitter tolerance of the data transmitting/receiving device 50 is evaluated.

According to embodiment 2, in the test mode, reception data RD is transmitted to the transmission serial port 11 without being passed through the parallel-serial conversion circuit 15 or the serial-parallel conversion circuit 16. Thus, reception data RD is not affected by a malfunction of the parallel-serial conversion circuit 15 or the serial-parallel conversion circuit 16, and therefore, the jitter tolerance is precisely measured.

First Variation of Embodiment 2

Hereinafter, a data transmitting/receiving device according to the first variation of embodiment 2 of the present invention is described with reference to the drawings.

Figure 6:
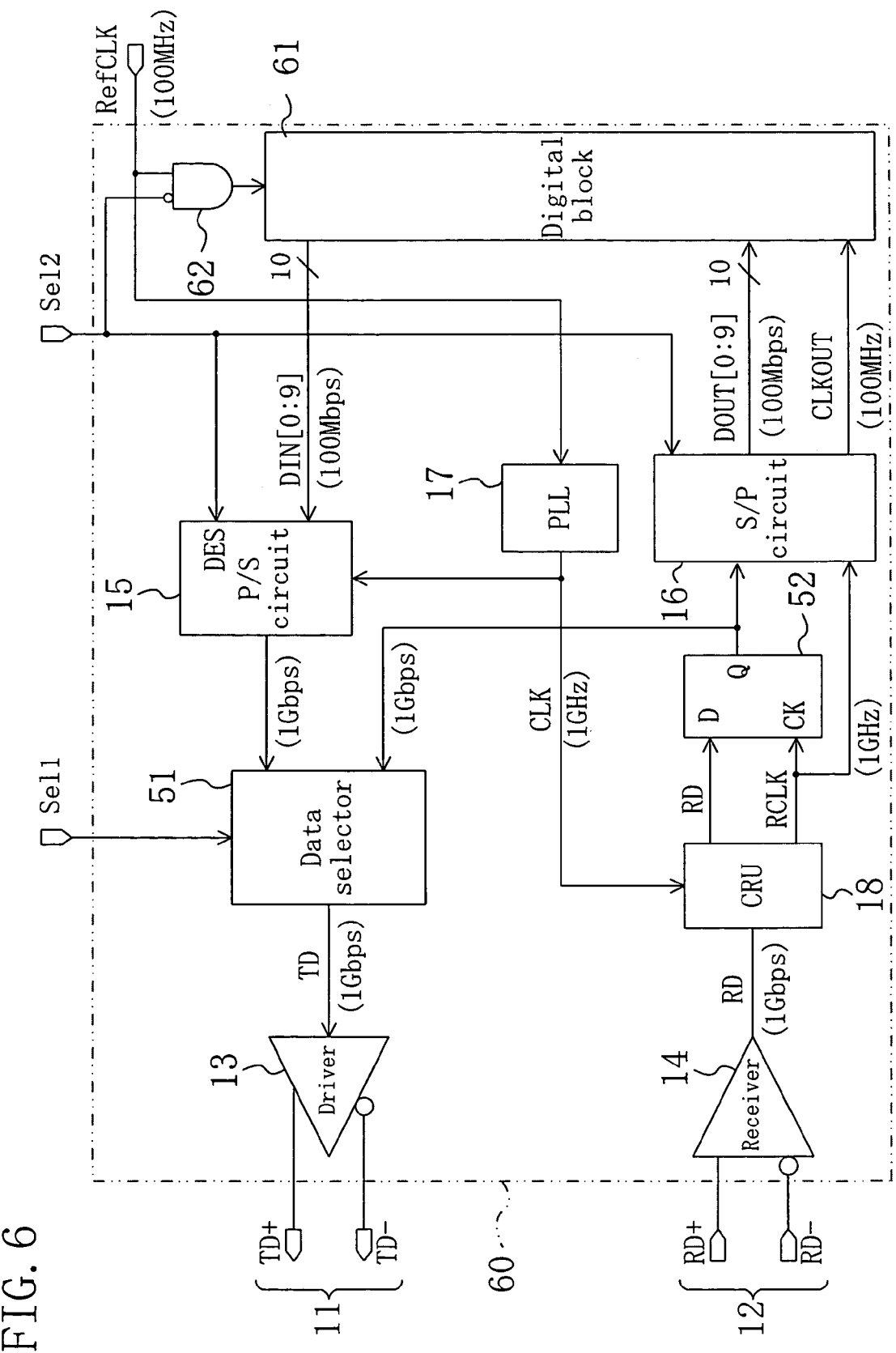
FIG. 6 is a block diagram showing the structure of a data transmitting/receiving device according to the first variation of embodiment 2 of the present invention.

FIG. 6 shows a block structure of the data transmitting/receiving device according to the first variation of embodiment 2 of the present invention. In FIG. 6, like elements are denoted by like reference numerals used in FIG. 5, and descriptions thereof are herein omitted.

As shown in FIG. 6, the data transmitting/receiving device 60 according to the first variation of embodiment 2 is different from the data transmitting/receiving device 50 in that a digital block 61 for inputting/outputting parallel data is provided inside the data transmitting/receiving device 60, and the data transmitting/receiving device 60 has a logic cell 62 as means for stopping the operation of the digital block 61.

The digital block 61 operates using externally-supplied reference clock RefCLK as an operation clock. The digital block 61 inputs input data DIN [0:9] to the parallel-serial conversion circuit 15 and, on the other hand, receives output data DOUT [0:9] and output clock CLKOUT which are output from the serial-parallel conversion circuit 16.

The logic cell 62 receives second selection signal Sel2 and controls whether or not reference clock RefCLK is supplied to the digital block 61. When second selection signal Sel2 is at "L" level, the logic cell 62 supplies reference clock RefCLK to the digital block 61. When second selection signal Sel2 is at "H" level, the logic cell 62 stops the supply of reference clock RefCLK, thereby stopping the operation of the digital block 61.

In each of the parallel-serial conversion circuit 15 and the serial-parallel conversion circuit 16, second selection signal Sel2 is input at disenable terminal DES. Thus, when second selection signal Sel2 is at "H" level, the operation of the parallel-serial conversion circuit 15 and the serial-parallel conversion circuit 16 is stopped.

Hereinafter, the operation of the data transmitting/receiving device 60 according to the first variation of embodiment 2 is described for respective modes with reference to FIGS. 2 and 3.

In the case where first selection signal Sel1 is at "L" level so that the data transmitting/receiving device 60 is used in the normal operation mode, second selection signal Sel2 is set to "L" level such that the operation clock is supplied to the digital block 61. Accordingly, the parallel-serial conversion circuit 15 inputs input data DIN [0:9] output from the digital block 61 to the data selector 51. The data selector 51 selects input data DIN and inputs the selected data to the driver 13. Thus, the data of the digital block 61 is output from the transmission serial port 11.

In the case where first selection signal Sel1 is at "H" level so that the data transmitting/receiving device 60 is used in the test mode, the data selector 51 selects serial data output from the latch circuit 52 and inputs the selected data to the driver 13. Thus, the data input from the reception serial port 12 is output from the transmission serial port 11.

The data transmitted and received does not pass through the parallel-serial conversion circuit 15 or the serial-parallel conversion circuit 16. Thus, transmission and reception of the data is not affected even when second selection signal Sel2 is set to "H" level such that the operation of the parallel-serial conversion circuit 15 and the serial-parallel conversion circuit 16 is stopped.

In the case where the data transmitting/receiving device 60 according to the first variation of embodiment 2 is used in the test mode, the data generator 21 is connected to the reception serial port 12 of the data transmitting/receiving device 60, and the data analyzer 22 is connected to the transmission serial port 11 of the data transmitting/receiving device 60 as in the jitter tolerance measurement system shown in FIG. 2. Test data is transmitted from the data generator 21 and analyzed by the data analyzer 22 as to whether or not a bit error exists, whereby the jitter tolerance of the data transmitting/receiving device 60 is evaluated.

In the case where second selection signal Sel2 is at "H" level, the logic cell 62 stops the supply of reference clock RefCLK to the digital block 61. Accordingly, the digital block 61 does not operate, and the operation of the parallel-serial conversion circuit 15 and the serial-parallel conversion circuit 16 is stopped. Thus, the jitter tolerance is evaluated in a state where the effects of the digital block 61, the parallel-serial conversion circuit 15 and the serial-parallel conversion circuit 16 on the CRU 18 are absent.

In the case where second selection signal Sel2 is at "L" level, the logic cell 62 supplies reference clock RefCLK to the digital block 61 so that the digital block 61 operates, and the parallel-serial conversion circuit 15 and the serial-parallel conversion circuit 16 also operate. Thus, the jitter tolerance is evaluated in a state where the CRU 18 is affected by the digital block 61, the parallel-serial conversion circuit 15 and the serial-parallel conversion circuit 16.

According to the data transmitting/receiving device 60 of the first variation of embodiment 2, the operation of the digital block 61, the parallel-serial conversion circuit 15 and the serial-parallel conversion circuit 16 can be stopped by controlling second selection signal Sel2. Therefore, whether or not an effect of noise caused by the operation of the digital block 61, the parallel-serial conversion circuit 15 and the serial-parallel conversion circuit 16 exists can be evaluated in the measurement of the jitter tolerance.

Second Variation of Embodiment 2

Hereinafter, a data transmitting/receiving device according to the second variation of embodiment 2 of the present invention is described with reference to the drawings.

Figure 7:
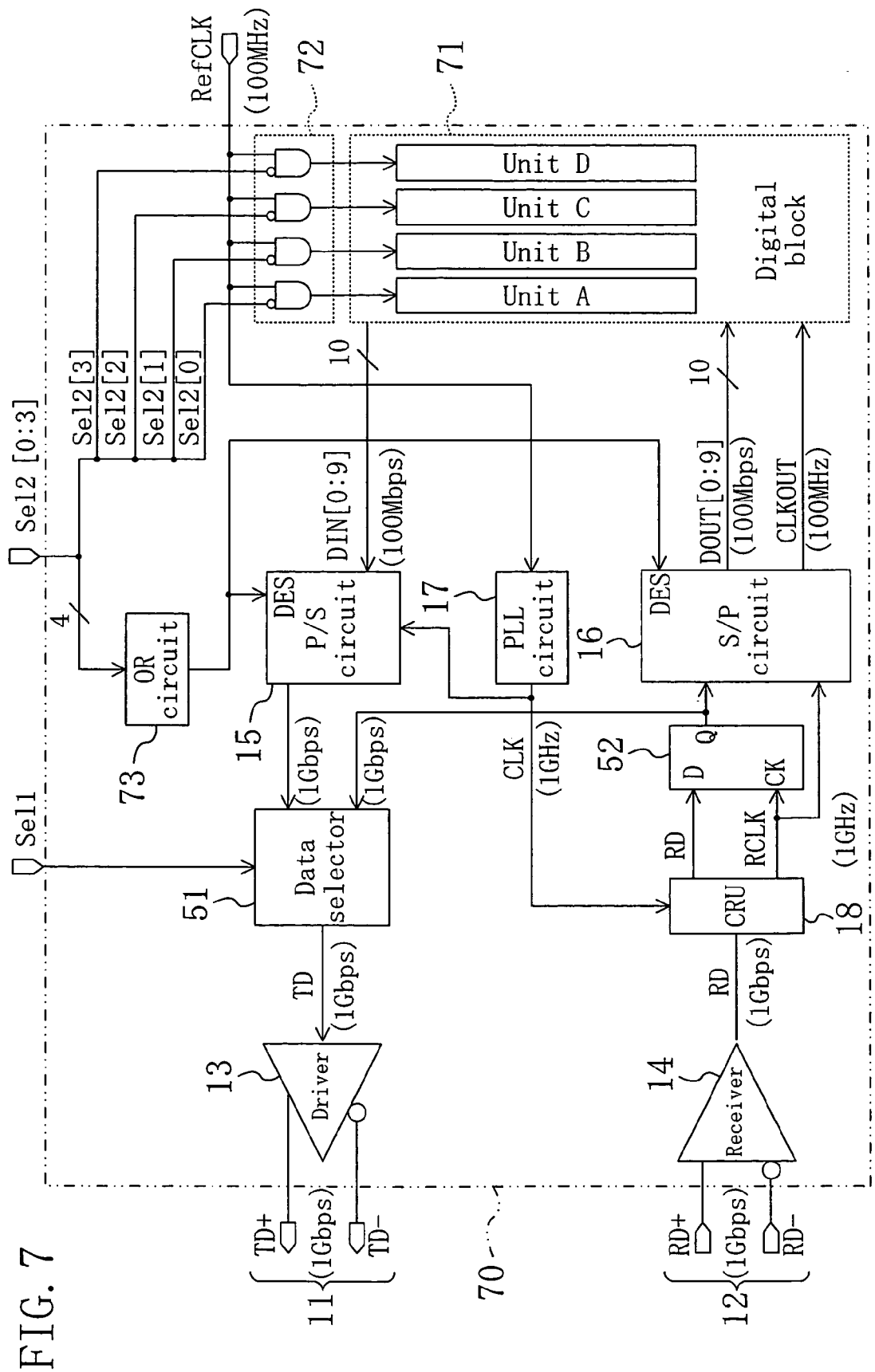
FIG. 7 is a block diagram showing the structure of a data transmitting/receiving device according to the second variation of embodiment 2 of the present invention.
Figure 8:
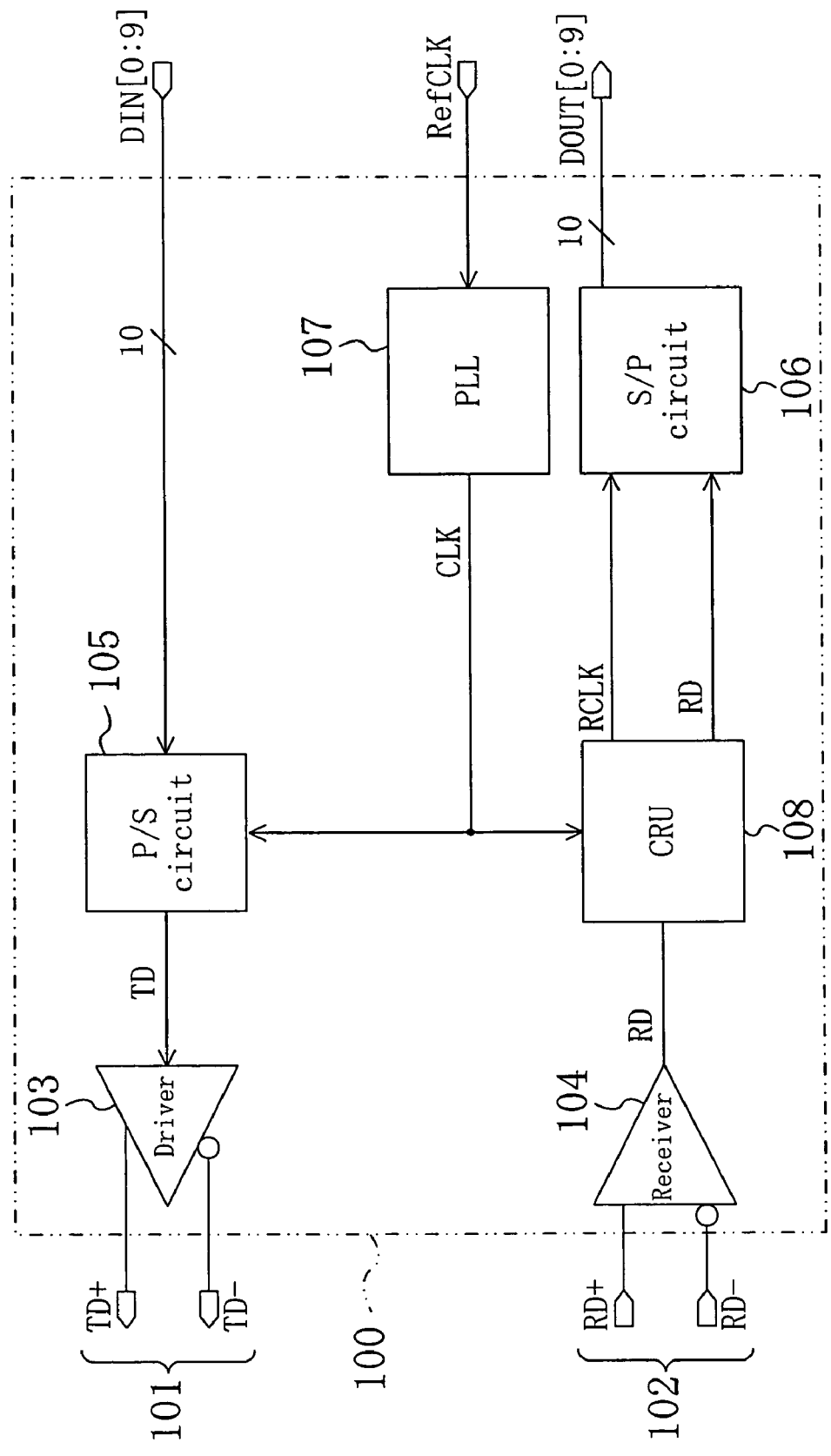
FIG. 8 is a block diagram showing the structure of a conventional data transmitting/receiving device.
Figure 9:
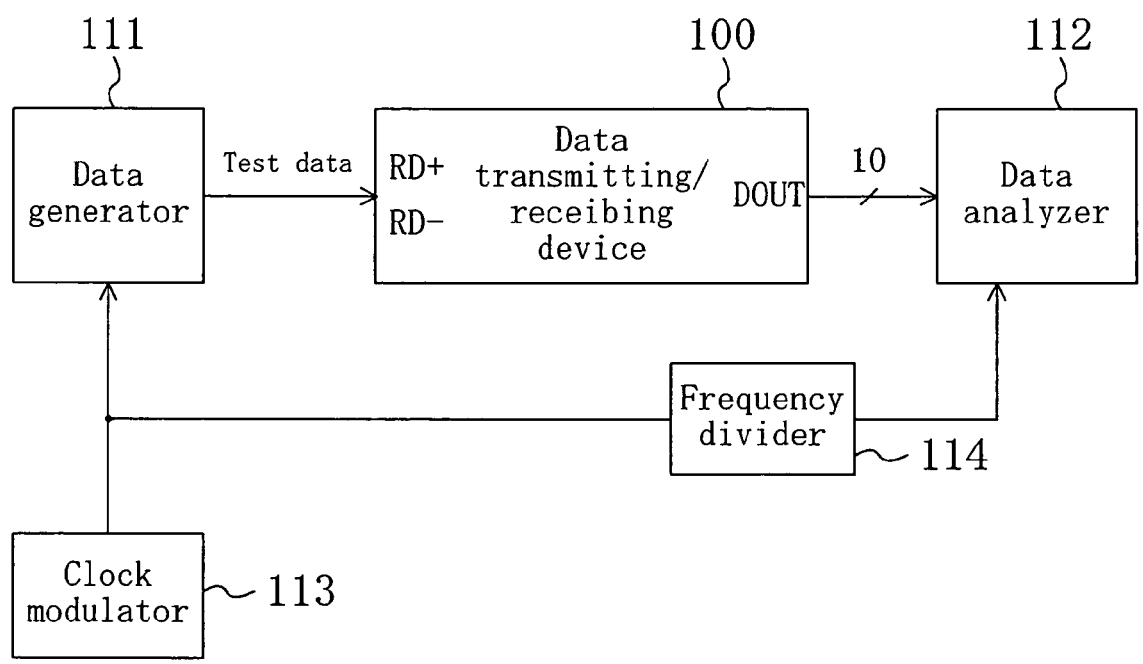
FIG. 9 is a block diagram showing a measurement system for measuring the jitter tolerance of the conventional data transmitting/receiving device.

FIG. 7 shows a block structure of the data transmitting/receiving device according to the second variation of embodiment 2 of the present invention. In FIG. 7, like elements are denoted by like reference numerals used in FIGS. 5 and 6, and descriptions thereof are herein omitted.

As shown in FIG. 7, the data transmitting/receiving device 70 according to the second variation of embodiment 2 includes a digital block 71 in place of the digital block 61 of the first variation. The digital block 71 includes separate units A to D, the distances of which from the CRU 18 are different from each other. The data transmitting/receiving device 70 further includes a logic block 72. The logic block 72 includes four logic cells which are respectively connected to the four units A to D. The input of reference clock RefCLK is controlled by second selection signal Sel2 [0:3] of 4-bit width which corresponds to the units A to D.

The logic block 72 controls independently an operation clock which is to be supplied to each unit of the digital block 71 according to second selection signal Sel2 [0:3]. Specifically, signals Sel2[0] to Sel2[3] of second selection signal Sel2 [0:3], each of which has a 1-bit width, correspond to units A to D of the logic block 72, respectively. When each of signals Sel2[0] to Sel2[3] is at "L" level, a corresponding unit is supplied with reference clock RefCLK. When each of signals Sel2[0] to Sel2[3] is at "H" level, the supply of reference clock RefCLK to a corresponding unit is stopped.

Second selection signal Sel2 [0:3] is input to an OR circuit 73 which has four terminals. An output terminal of the OR circuit 73 is connected to disenable terminals DES of the parallel-serial conversion circuit 15 and the serial-parallel conversion circuit 16. Thus, when any of the bits of second selection signal Sel2 [0:3] is at "H" level, the operation of the parallel-serial conversion circuit 15 and the serial-parallel conversion circuit 16 is stopped.

Hereinafter, the operation of the data transmitting/receiving device 70 according to the second variation of embodiment 2 is described for respective modes with reference to FIGS. 2 and 7.

In the case where first selection signal Sel1 is at "L" level so that the data transmitting/receiving device 70 is used in the normal operation mode, all of signals Sel2[0] to Sel2[3] of second selection signal Sel2 [0:3] are set to "L" level such that the operation clock is supplied to the respective units of the digital block 71. Accordingly, the parallel-serial conversion circuit 15 inputs to the data selector 51 input data DIN [0:9] output from the digital block 71. The data selector 51 selects input data DIN [0:9] and inputs the selected data to the driver 13. Thus, the data of the digital block 71 is output from the transmission serial port 11.

In the case where first selection signal Sel1 is at "H" level so that the data transmitting/receiving device 70 is used in the test mode, the data selector 51 selects serial data output from the latch circuit 52 and inputs the selected data to the driver 13. Thus, the data input from the reception serial port 12 is output from the transmission serial port 11.

The data transmitted and received does not pass through the parallel-serial conversion circuit 15 or the serial-parallel conversion circuit 16. Thus, transmission and reception of the data is not affected even when any of signals Sel2[0] to Sel2[3] of second selection signal Sel2 [0:3] is set to "H" level such that the operation of the parallel-serial conversion circuit 15 and the serial-parallel conversion circuit 16 is stopped.

In the case where the data transmitting/receiving device 70 according to the second variation of embodiment 2 is used in the test mode, the data generator 21 is connected to the reception serial port 12 of the data transmitting/receiving device 70, and the data analyzer 22 is connected to the transmission serial port 11 of the data transmitting/receiving device 70 as in the jitter tolerance measurement system shown in FIG. 2. Test data is transmitted from the data generator 21 and analyzed by the data analyzer 22 as to whether or not a bit error exists, whereby the jitter tolerance of the data transmitting/receiving device 70 is evaluated.

Each of units A to D of the digital block 71 does not operate when a corresponding signal of second selection signal Sel2 [0:3] is at "H" level but operates when the corresponding signal is at "L" level. Thus, the effects of noise which vary according to the distance between the CRU 18 and the digital block and the effects of noise which vary according to the size of the digital block can be evaluated.

When the operation of any of the units A to D of the digital block 71 is stopped, the operation of the parallel-serial conversion circuit 15 and the serial-parallel conversion circuit 16 is stopped by the OR circuit 73. Thus, the effects of noise, which vary according to the size of the digital block and which vary according to the distance from the CRU 18, can be evaluated in a state where the evaluation is not influenced by the operation of the parallel-serial conversion circuit 15 and the serial-parallel conversion circuit 16.

What is claimed is:

1. A data transmitting/receiving device, comprising:
a serial-parallel conversion circuit for converting received first serial data to first parallel data;
a data selection circuit for selecting any one of the first parallel data and externally-supplied second parallel data and outputting the selected data; and
a parallel-serial conversion circuit for converting the first or second parallel data output from the data selection circuit to second serial data which is to be transmitted,
wherein the parallel-serial conversion circuit receives a common clock signal with the serial-parallel conversion circuit and operates in synchronization with the common clock signal when the data selection circuit selects the first parallel data.

2. The data transmitting/receiving device of claim 1, further comprising a clock adjustment circuit for receiving a first clock signal and the first serial data and adjusting the first clock signal to output a second clock signal which is in synchronization with the first serial data,
wherein the serial-parallel conversion circuit operates in synchronization with the second clock signal.

3. The data transmitting/receiving device of claim 1, further comprising a clock selection circuit for selecting any one of the first clock signal and the second clock signal and inputting the selected clock signal to the parallel-serial conversion circuit, wherein:
when the data selection circuit selects the first parallel data, the clock selection circuit selects the second clock signal; and
when the data selection circuit selects the second parallel data, the clock selection circuit selects the first clock signal.

4. A data transmitting/receiving device, comprising:
a serial-parallel conversion circuit for converting received first serial data to first parallel data;
a data processing circuit for outputting second parallel data;
a control circuit for stopping the operation of the data processing circuit;
a data selection circuit for selecting any one of the first parallel data and the second parallel data and outputting the selected data; and
a parallel-serial conversion circuit for converting the first or second parallel data output from the data selection circuit to serial data which is to be transmitted,
wherein the parallel-serial conversion circuit receives a common clock signal with the serial-parallel circuit and operates in synchronization with the common clock signal when the data selection circuit selects the first parallel data.

5. The data transmitting/receiving device of claim 4, further comprising a clock adjustment circuit for receiving a first clock signal and the first serial data and adjusting the first clock signal to output a second clock signal which is in synchronization with the first serial data,
wherein the serial-parallel conversion circuit operates in synchronization with the second clock signal.

6. The data transmitting/receiving device of claim 5, further comprising a clock selection circuit for selecting any one of the first clock signal and the second clock signal and inputting the selected clock signal to the parallel-serial conversion circuit, wherein:
when the data selection circuit selects the first parallel data, the clock selection circuit selects the second clock signal; and when the data selection circuit selects the second parallel data, the clock selection circuit selects the first clock signal.

7. The data transmitting/receiving device of claim 5, wherein:
the data processing circuit is divided into a plurality of units, the distances of the plurality of units from the clock adjustment circuit being different from each other; and
the control circuit stops the operation of the data processing circuit independently for each of the units.

8. The data transmitting/receiving device of claim 6, wherein:
the data processing circuit is divided into a plurality of units, the distances of the plurality of units from the clock adjustment circuit being different from each other; and
the control circuit stops the operation of the data processing circuit independently for each of the units.

9. A data transmittina/receiving device, comprising:
a latch circuit for storing received first serial data;
a serial-parallel conversion circuit for converting the first serial data to first parallel data;
a parallel-serial conversion circuit for converting externally-supplied second parallel data to second serial data;
a data selection circuit for selecting any one of the first serial data and the second serial data and outputting the selected data as transmission data; and
a clock adjustment circuit for receiving a first clock signal and the first serial data and adjusting the first clock signal to output a second clock signal which is in synchronization with the first serial data,
wherein the latch circuit and the serial-parallel conversion circuit operate in synchronization with the second clock signal.

10. A data transmitting/receiving device, comprising:
a latch circuit for storing received first serial data;
a serial-parallel conversion circuit for converting the first serial data to first parallel data;
a data processing circuit for outputting second parallel data;
a control circuit for stopping the operation of the data processing circuit;
a parallel-serial conversion circuit for converting the second parallel data to second serial data;
a data selection circuit for selecting any one of the first serial data and the second serial data and outputting the selected data as transmission data; and
a clock adjustment circuit for receiving a first clock signal and the first serial data and adjusting the first clock signal to output a second clock signal which is in synchronization with the first serial data,
wherein the latch circuit and the serial-parallel conversion circuit operate in synchronization with the second clock signal.

11. The data transmitting/receiving device of claim 10, wherein when the control circuit stops the data processing circuit, the parallel-serial conversion circuit and the serial-parallel conversion circuit stop their operation.

12. The data transmitting/receiving device of claim 10, wherein when the control circuit stops the data processing circuit, the parallel-serial conversion circuit and the serial-parallel conversion circuit stop their operation.

13. The data transmitting/receiving device of claim 10, wherein:
the data processing circuit is divided into a plurality of units, the distances of the plurality of units from the clock adjustment circuit being different from each other; and
the control circuit stops the operation of the data processing circuit independently for each of the units.

14. The data transmitting/receiving device of claim 13, wherein when the control circuit stops at least one of the plurality of units, the parallel-serial conversion circuit and the serial-parallel conversion circuit stop their operation.

* * * * *